No. 795,681. PATENTED JULY 25, 1905.
H. BECK.
ELECTRIC ARC LIGHT.
APPLICATION FILED JAN. 21, 1904.
2 SHEETS—SHEET 1.
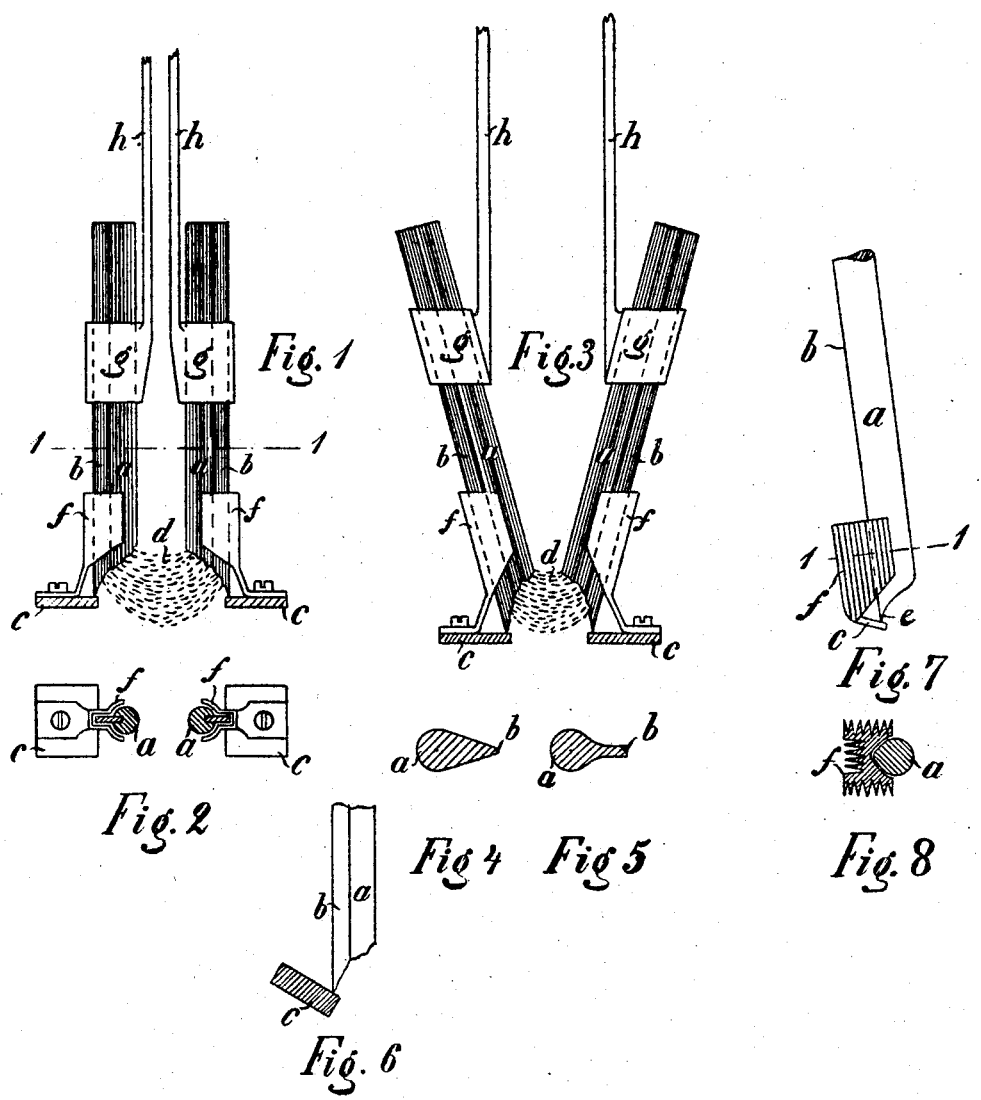

No. 795,681. PATENTED JULY 25, 1905.
H. BECK.
ELECTRIC ARC LIGHT.
APPLICATION FILED JAN. 21, 1904.
2 SHEETS—SHEET 2.
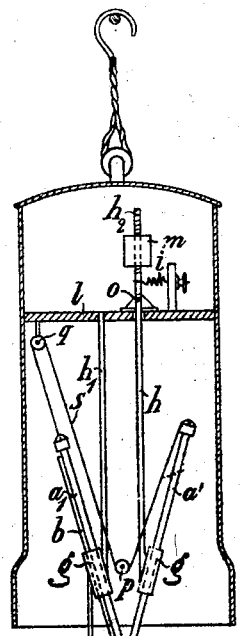
Fig. 9
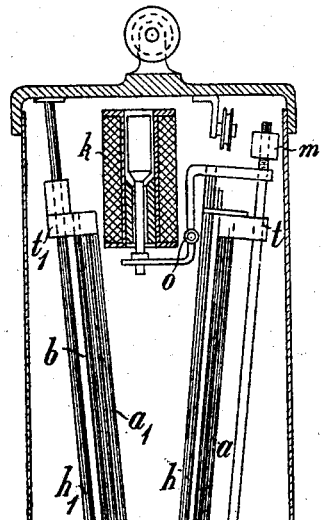
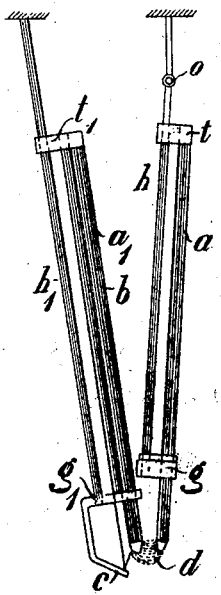
Fig. 10
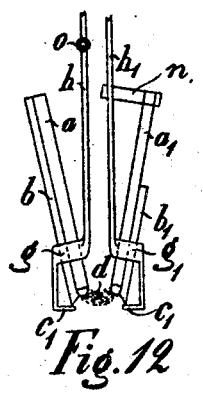
Fig. 12
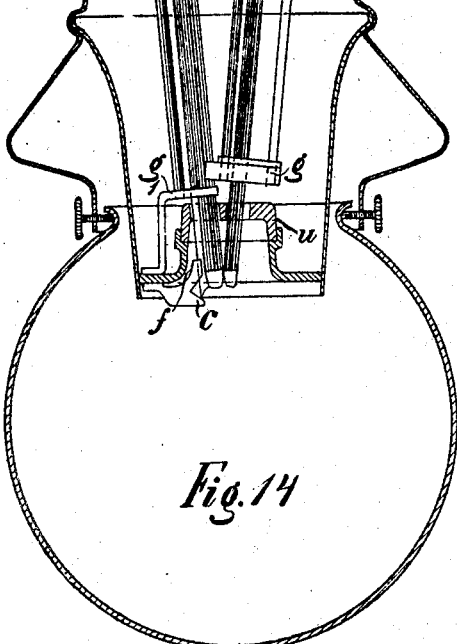
Fig. 14
Fig. 11
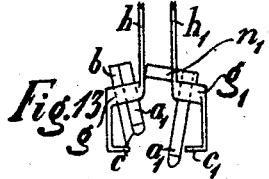
Fig. 13
Witnesses
Inventor
Heinrich Beck

UNITED STATES PATENT OFFICE.

HEINRICH BECK, OF MEININGEN, GERMANY, ASSIGNOR OF ONE-HALF TO THE FIRM OF PHYSIKALISCH-TECHNISCHES LABORATORIUM G. M. B. H., OF MEININGEN, GERMANY, AND ONE-HALF TO THE FIRM OF ALLGEMEINE LICHTGESELLSCHAFT MIT BESCHRÄNKTER HAFTUNG, OF BERLIN, GERMANY.

ELECTRIC-ARC LIGHT.

No. 795,681.      Specification of Letters Patent.      Patented July 25, 1905.

Application filed January 21, 1904. Serial No. 195,320.

*To all whom it may concern:*

Be it known that I, HEINRICH BECK, civil engineer, a subject of the German Emperor, residing at 7 Leipzigerstrasse, in the city of Meiningen, in the German Empire, have invented certain new and useful Improvements in Electric-Arc Lights, of which the following is a specification.

The advantages of my new electric-arc lamp for continuous current, as well as for alternating current, are based upon a new principle for regulating the feed of the electrodes. This principle is characterized by the electrode resting laterally upon a support with its extreme end, this end, which constitutes the supporting-point of the electrodes, being gradually consumed by the heat of the arc-light, so that the electrodes will descend in a perfectly uniform manner. The lateral edge of the electrode, the end of which rests upon a suitable support, consists in my invention of carbon or of some material which is converted into carbon by combustion and which shows a similar behavior. The lateral edge, the extreme end of which constitutes the resting-point of the electrode, may consist of a special narrow ridge of carbon or the like, which is laterally attached to the electrode, or it may be formed by shaping the electrode itself correspondingly. It is essential in my invention that the electrode with lateral supporting-ridge, the extreme end of which rests upon a support, is pointed and hollowed out at the side which faces the arc-light in such a manner that a lateral starting or supporting point, so to speak, is provided for the arc-light, whereby a quiet burning of the electric arc is produced in the new lamp. The lateral supporting-ridge may be provided on both electrodes; but it is sufficient to have the positive electrode only resting with the end of its outer edge upon a support and then securing the uniform feed of both electrodes by suitably coupling the electrodes with each other. In order to protect the electrodes against the lower parts of the supporting edges burning out laterally, this part of the electrodes in a modification of my invention is provided with a device for limiting the supply of air—a sleeve or the like, for instance, preferably made of metal and being of sufficient size and presenting a sufficient cooling-surface for transmitting the heat resulting from the electrode to the air without becoming incandescent itself. Inasmuch as the supporting edges are made of carbon or the like, a perfectly uniform combustion or evaporation of the pointed end of the supporting-ridges is produced by the electric arc; nor is there any disturbance of the arc or coloration of the same by material dripping down from the supporting-ridges. For the purpose of operating and for cutting out electric-arc lamps of this kind igniting and extinguishing devices of most simple construction may be employed.

Hereinafter some modifications of my invention are shown and will be illustrated in the accompanying drawings.

In the drawings, Figure 1 shows an arrangement of the electrodes in form of two vertical and parallelly-arranged carbon rods or pencils provided with lateral combustion-ridges. Fig. 2 is a section through Fig. 1 on the line of section 1 1, a part being shown in plan view. Fig. 3 shows an arrangement of electrodes having two carbon rods arranged at an angle to each other. Figs. 4 and 5 are two different cross-sections through carbon rods of different outer shape. Fig. 6 represents an arc-light electrode, the supporting-ridge of which rests upon an inclined supporting-surface. Figs. 7 and 8 represent in elevation and in sectional view an arc-light electrode with lateral supporting-ridge protruding only slightly outward and with an air-protecting sleeve or casing with cooling-ribs. Fig. 9 represents a convenient form of coupling and of suspension of two arc-light electrodes arranged at an angle to each other, of which the positive electrode is provided with a lateral supporting-ridge. Figs. 10, 11, 12, and 13 are representations of two different automatic extinguishing devices for arc-light electrodes with lateral supporting-ridge in the normal and in the operative position. Fig. 14 is a section through the interior of a modification of an electric-arc-light lamp in accordance with my invention.

In the drawings, Fig. 1 represents two arc-light electrodes vertically and parallelly-arranged with relation to each other, the said electrodes *a* being provided with longitudinal supporting or combustion ridges *b* of carbon. These supporting-ridges *b* are attached by glue or some other similar adhesive to the electrodes, which are provided with a corresponding groove, as shown in plan and in section on the line 1 1 in Fig. 2 of the drawings. The tapering ends of the supporting-ridges *b* rest each upon a supporting-surface *c* of metal or of refractory material. These supporting-surfaces are preferably arranged adjustably in relation to the electrodes. These supporting-ridges, as appear from Figs. 1, 3, and 6 of the drawings, become pointed in a peculiar manner in the heat of the arc, and if made of sufficient thickness they reach beyond the carbon pencils *a* upon the burning away of the electrodes. The points of the supporting-ridges *b*, which reach beyond the carbon pencils, preferably provided with a core, form at the same time the lateral bordering of the arc-light *d*, in consequence whereof the variations of this arc-light are considerably reduced. The sleeves *f*, which are attached to the supporting-surfaces *c* and which surround part of the supporting-ridges *b* above the supporting-points, restrict the admission of air to these parts of the supporting-ridges, which parts are yet exposed to the immediate influence of the heat of the electric arc, and they thereby prevent the objectionable lateral burning out of the supporting-ridges above their supporting-points. This lateral air protection is of considerable importance for the uniform feed of the electrodes.

The electrodes *a* in the form of execution of the invention (represented in Figs. 1 to 3 of the drawings) are free to slide, with their supporting-ridges *b*, in sleeves or shoes *g*, surrounding the electrodes and secured to parallel electrode-supports *h*. In the burning away of the carbon pencils *a* the projecting tapered ends of the supporting-ridges *b* are also gradually consumed in proportion, so that the electrodes descend uniformly within the shoes *g* without any special device. The increase or reduction of the distance of the lower edges of the air-protecting sleeve from the supporting-surface of the supporting-ridge presents a means for adjusting the feed of the electrodes with more or less exactness inasmuch as the burning away or the wearing off of the fine points of the supporting-ridges takes place in longer or shorter periods, respectively, according to the height of the air-protecting sleeve. If the two electrodes of a lamp are suitably connected or coupled to each other, a supporting-ridge will only be necessary on one electrode and in particular on the positive electrode. As the arc-light of the positive electrode is most subject to variations, the lateral bordering of the arc-light by the pointed end of the combustion-ridge on the positive electrode is sufficient, as a rule.

The above-described lamp may also be employed with four or more carbon pencils.

The arrangement shown in Fig. 3 of the drawings is distinguished from the form illustrated in Fig. 1 only by the inclined position of the electrodes.

Figs. 4 and 5 show arc-light electrodes in cross-section where the longitudinal combustion-ridges are formed by giving a suitable shape to the carbons.

In order to prevent the accumulation of ashes and the like upon the supporting-surface *c* of the supporting-ridge *b*, this supporting-surface *c* is preferably inclined, as shown in Fig. 6 of the drawings.

I have found from experiments that when using an air-protecting casing or sleeve of a material which is a good conductor of heat and which affords a sufficient heat-radiating surface or volume the lateral combustion-ridge of the arc-light electrode needs only to be very narrow and that it can even be discarded entirely when the conditions are very favorable without the continued formation of a lateral supporting-ridge for the electrode and the uniform consumption of the said supporting-ridge being interfered with. By means of an air-protecting casing or sleeve of sufficient mass or body and of sufficient radiating-surface I have succeeded to also control the feed of circular electrodes for arc-lights by means of lateral supporting-ridges.

Figs. 7 and 8 of the drawings represent in side view and in cross-section a form of execution of the feeding device according to this invention, where the carbon pencil *a* is only provided with a very narrow combustion-ridge *b*, which projects but slightly beyond the circular section, the said combustion-ridge resting with its point upon a supporting-surface which is somewhat downwardly inclined. Above the supporting-point the arc-light electrode is surrounded by a metal sleeve *f*, which presents a comparatively large mass and body and sufficient radiating-surface so as to be able to carry off to the air the heat taken up by the electrode without becoming red-hot itself. The support *c* preferably forms a whole with the metal sleeve *f* in order to thus effect a sufficient carrying off of the heat of the supporting-ridge, as clearly shown in the hereunto annexed drawings.

In order to induce the formation of the arc, igniting devices of any suitable and well-known construction may be used. Electrodes which are arranged at an angle to each other are preferably suspended from electrode-containing supports or holders, one or both of which are rotatably or rockingly arranged, Fig. 14, so that the points of the carbon rods will touch each other when the lamp is without current, thus making the contact necessary for the formation of the arc upon the switching on of the lamp. For the purpose of keeping the points of carbon pencils which are arranged at an angle to each other at the required distance during the operation of the lamp a small pulling-magnet $k$, operatively connected to the movable electrode-support $h$, may be employed, Fig. 14.

Instead of movably suspending both electrode-holders one of them may be rigidly secured, as shown in Fig. 9 of the drawings, which represents an arrangement of electrodes with downwardly-inclined carbon pencils $a\ a'_1$ in vertically-depending electrode holders or supports $h\ h'_1$, with shoes $g$. The electrode-holder $h'$ is rockingly suspended from a wall-support, and it is extended upwardly in a vertical direction beyond the point of suspension. To the threaded end of this extension is operatively connected a spring, which may be regulated by means of a screw. This spring serves only for the suitable adjustment of the electrodes with respect to each other.

By means of the displaceable weight $m$ the electrode-holder may be poised in such a manner as to be in the position of neutral equilibrium, any oscillations of the electric lamp in consequence of exterior forces being thus unable to disturb the equilibrium of the movably-suspended electrode-holder $h'$. The equilibrium of the movably-suspended electrode may also be regulated by increasing or diminishing the mass of the weight $m$.

In Fig. 9 a preferred means of coupling the two electrodes $a\ a'_1$ to each other is shown, whereby a preferably uniform descent of both electrodes is secured, while a supporting-ridge is only used in connection with one electrode. Only one of the carbon pencils $a$ is provided with a longitudinal supporting-ridge $b$ of carbon, which rests against a support $c$. To the upper end of the carbon pencil $a_1$ a tape or chain $s$ or the like is fastened, which passes around two stationary rollers $p$ and $q$, and the other end of which is fastened to the second electrode $a'$. As the supporting-ridge $b$ is gradually consumed by the arc-light in accordance with the combustion of the electrode $a_1$, the said electrode will also descend into the shoe $g$. The tape $s$, to which the second electrode is suspended and which passes around the rollers $p$ and $q$, is thereby shortened in the part directed toward the electrode $a_1$, which movement is immediately followed by a corresponding lengthening of the part of the tape directed toward the electrode $a$. In consequence thereof the carbon pencil $a'$ descends the same distance as the electrode $a_1$ has descended in accordance with the burning away of the supporting-ridge $b$.

The positively-connected feeding device of the carbon rods or pencils, (shown in Fig. 9,) which operates by means of but one combustion-ridge $b$ on the positive electrode $a_1$ and by means of the roller and rope transmission device $s\ p\ q$, also contributes to the quieting or damping of the oscillations of the rotatably or rockingly suspended electrode-holder $h'$ inasmuch as there will be a slight displacement of the carbon rod $a'$ within the corresponding shoe $g$ accompanying these oscillations, the friction caused thereby between the carbon and the shoe operating to counteract these oscillations.

Apart from the above-mentioned advantages the longitudinal supporting-ridges of the carbon rods or pencils afford a simple means for the automatic switching out of circuit of the electric-arc lamp in all cases where the carbon pencils are burned away to such a degree that a melting action on the metal parts of the lamp by the burning of the arc-light is to be feared.

In the form of execution of an automatic extinguishing device shown in Figs. 12 and 13, the feeding of the electrodes is regulated by the combustion of the supporting-ridges $b$ and $b_1$, the extreme ends of which rest upon supporting-surfaces $c$ and $c_1$. The supporting-ridge $b_1$ of the electrode $a_1$ is recessed in its upper part, or it may be entirely dispensed with. If the consumption of the carbon pencil $a_1$ has advanced sufficiently so that the supporting-ridge $b_1$ is used up by the arc-light up to the commencement of the recess, the carbon pencil $a_1$, which has now become deprived of its support, drops down suddenly for a somewhat larger distance, and in consequence of the displacement of the pointed ends of the carbon pencils $a$ and $a_1$ in relation to each other resulting therefrom the arc of light $d$ is broken off and the lamp is extinguished. (See Fig. 13.) The reformation of the arc of light is prevented in this form of execution by an arm provided at the upper end of the carbon pencil $a_1$ and consisting of insulating material or which is correspondingly insulated and which keeps the rotatably-arranged carbon-holder $h$ locked in the position in which it is at a distance from the carbon-holder $h_1$.

In Figs. 10 and 11 I have shown an automatic extinguishing device for arc-light-lamp electrodes with combustion-ridges. Of the electrodes $a$ and $a_1$ the electrode $a$ is provided with a laterally-arranged combustion-ridge $b$, of carbon, which insures a uniform feed of this electrode in accordance with the combustion. By coupling the two electrodes $a$ and $a_1$ with each other in any suitable manner the second electrode $a'$ is also fed forward correspondingly. The electrode $a_1$ slides down along the electrode-holder $h_1$, and it is partly guided within a ring $g_1$, while at the upper end the current-admission device $t_1$ embraces the holder $h_1$. The extreme end of the combustion-ridge $b$ rests upon a supporting-surface $c$, provided upon the electrode-holder $h$, the said supporting-surface being connected to the guide-ring $g$ of the electrode-holder. The arc-light electrode $a'$ slides down within the guide-ring $g'$ and along the electrode-holder $h'$, together with the current-admission device $t'$, the holder being rotatable on the pivot $o$. The guide-ring $g'$ of the movable electrode-holder $h'$ of the carbon pencil $a'$ is arranged higher than the guide-ring $g$ of the electrode-holder $h$ of the carbon pencil $a$. Hence the current-admission piece $t$ touches the pole-piece $g'$ of the electrode-holder $h$ after the carbon pencil $a$ is sufficiently consumed and already before the current-admission piece $t_1$ of the other carbon pencil $a_1$ touches the guide-ring $g_1$ of the electrode-holder $h_1$. Thus the further dropping down of the carbon pencil $a$ is prevented, before even the dropping down of the other carbon pencil $a_1$ is stopped. Hence the carbon pencil $a_1$ descends gradually proportionately with the consumption of the ridge $b$, while the carbon pencil $a$, which is kept arrested, burns off and becomes shortened more and more, so that the extreme ends of the two carbon pencils $a$ and $a_1$ become more and more distant until the gradually-lengthened arc of light $d$ finally breaks off and the lamp is extinguished, Fig. 11.

Fig. 14 represents in sectional view taken through the lamp-casing an electric-arc lamp in accordance with this invention which is provided with a regulating-electromagnet $k$ and with an extinguishing device in accordance with Figs. 10 and 11. The lower ends of the carbon rods are surrounded by a cylindrical reflector and economizer $u$, of fireproof material.

What I claim, and desire to secure by Letters Patent of the United States, is—

1. In an electric-arc lamp, a pair of carbon electrodes arranged points downward, a lateral support on which one of said electrodes rests with its extreme lower point, and means for retarding the consumption of the part of the electrode turned away from the arc of light.

2. In an electric-arc lamp, a pair of carbon electrodes arranged points downward, one of said electrodes having a longitudinal ridge projecting beyond the lower point of the electrode, a lateral support on which said ridge rests with its extreme lower point, and means for retarding the consumption of the ridge.

3. In an electric-arc lamp, a pair of carbon electrodes arranged points downward, a lateral support on which one of said electrodes rests with its extreme lower point, and means for limiting the access of air to the part of the electrode turned away from the arc of light and retarding the consumption of said part of the electrode.

4. In an electric-arc lamp, a pair of carbon electrodes arranged points downward, one of said electrodes having a longitudinal ridge projecting beyond the point of the electrode, a lateral support on which said ridge rests with its extreme lower point, and means for limiting the access of air to the lower part of the ridge causing it to be consumed more slowly than the electrode.

5. In an electric-arc lamp, a pair of carbon electrodes arranged points downward, a lateral support on which one of said electrodes rests with its extreme lower point and means for conducting the waste heat away from the part of the electrode turned away from the arc of light causing retardation of the consumption of that part of the electrode.

6. In an electric-arc lamp having carbon electrodes with points downward and lateral supports for said electrodes, the combination of carbon-holders permitting the carbon pencils to move in a downward direction only, said carbon pencils resting with their extreme lower ends turned away from the arc of light on said lateral supports, means causing the resting-points of the electrodes to be consumed more slowly than the other parts of the lower ends of said electrodes and means for forming an arc of light between the inner faces of the lower ends of the carbon electrodes.

7. In an electric-arc lamp having carbon electrodes with points downward, the combination of carbon-holders permitting the carbon pencils to move in a downward direction only, a lateral support upon which one of said carbon pencils rests with its extreme lower end turned away from the arc of light, the support being of a relatively large piece of metal so as to cool the resting-point of the electrode and means for forming an arc of light between the inner faces of the lower ends of the carbon electrodes.

8. In an electric-arc lamp having carbon electrodes with points downward, the combination of lateral supports for said electrodes, carbon-holders permitting of the carbon pencils to move in a downward direction only, said carbon pencils having longitudinal ridges of carbon, resting with the extreme lower ends of said carbon ridges on said lateral supports and said carbon ridges being metal-plated to cause them to be consumed more slowly than the other parts of the lower ends of the electrodes, and means for forming an arc of light between the lower ends of the carbon electrodes.

9. In an electric-arc lamp having carbon electrodes with points downward, the combination of carbon-holders permitting the carbon pencils to move in a downward direction only, a lateral support on which one carbon electrode rests with its extreme lower end, opposite to the arc of light, means causing the resting-point of this electrode to be consumed more slowly than the other part of its lower end, means through which one of the carbon-holders is movably suspended, a guide-roller fixed near the lower part of the lamp, another guide-roller at one side of the upper part of the lamp, a flexible connection passing over said guide-rollers and having its ends secured to the upper ends of the carbon electrodes, an electromagnet having an armature in operative connection with the movably-suspended carbon-holder, means for arresting the downward movement of one of the electrodes within its holder before arresting the downward movement of the other electrode within its holder, and a casing surrounding all of said parts.

10. In an electric-arc lamp, the combination of a lateral support, a carbon electrode arranged point downward and resting with its extreme lower end on said support, a second carbon electrode arranged point downward, holders for said electrodes, one of said holders being movably suspended and the electrodes being displaceably arranged within said holders, an extension on the movable holder projecting beyond its point of suspension, a balance-weight on said extension, an adjustable spring in operative connection with said extension and adapted to move the electrodes toward each other, an electromagnet having an armature in operative connection with said extension, and a casing surrounding all of said parts.

In witness whereof I have hereunto set my hand in the presence of two witnesses.

HEINRICH BECK.

Witnesses:
  OSKAR ARENDT,
  HENRY HASPER.